United States Patent
Zhu

(10) Patent No.: US 11,943,069 B2
(45) Date of Patent: Mar. 26, 2024

(54) DATA TRANSMISSION METHOD AND DEVICE, BASE STATION, TERMINAL AND STORAGE MEDIUM

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 430 days.

(21) Appl. No.: 17/288,911

(22) PCT Filed: Oct. 31, 2018

(86) PCT No.: PCT/CN2018/112928
§ 371 (c)(1),
(2) Date: Apr. 26, 2021

(87) PCT Pub. No.: WO2020/087329
PCT Pub. Date: May 7, 2020

(65) Prior Publication Data
US 2021/0399847 A1 Dec. 23, 2021

(51) Int. Cl.
*H04W 72/0446* (2023.01)
*H04L 1/1867* (2023.01)
(Continued)

(52) U.S. Cl.
CPC ....... *H04L 1/1896* (2013.01); *H04W 72/0446* (2013.01); *H04W 72/0453* (2013.01); *H04W 72/1263* (2013.01); *H04W 72/23* (2023.01)

(58) Field of Classification Search
CPC .............. H04L 1/1896; H04W 72/23; H04W 72/0446; H04W 72/0453; H04W 72/1263
See application file for complete search history.

(56) References Cited

U.S. PATENT DOCUMENTS

| 6,418,315 B1* | 7/2002 | Seo | H04W 92/14 455/435.1 |
| 2007/0042814 A1* | 2/2007 | Kakimoto | H04W 52/0258 455/574 |

(Continued)

FOREIGN PATENT DOCUMENTS

| CN | 102932115 A | 2/2013 |
| CN | 105379381 A | 3/2016 |

(Continued)

OTHER PUBLICATIONS

3GPP TSG RAN WG1 Meeting #94bis R1-1810385, Chengdu, China, Oct. 8-12, 2018, Source: vivo, Title: Discussion on the enhancements to configured grants, Agenda Item: 7.2.2.4.4, Document for: Discussion and Decision.

(Continued)

*Primary Examiner* — Dai Phuong
(74) *Attorney, Agent, or Firm* — Syncoda LLC; Feng Ma

(57) ABSTRACT

A data transmission method includes that: a base station transmits a control instruction to a terminal, the control instruction carrying indication information and the indication information indicating multiple resource positions configured for the terminal to transmit feedback data in an unlicensed channel; and the feedback data transmitted by the terminal is received, the feedback data being transmitted by the terminal through at least one resource position among the multiple resource positions in the case of the unlicensed channel being occupied by the terminal.

16 Claims, 11 Drawing Sheets

---

A control instruction is transmitted to a terminal, the control instruction carrying indication information and the indication information indicating multiple resource positions configured for the terminal to transmit feedback data in an unlicensed channel — 201

The feedback data transmitted by the terminal is received, the feedback data being transmitted by the terminal through at least one resource position among the multiple resource positions in the case of the unlicensed channel being occupied by the terminal and the feedback data indicating whether the terminal has correctly received communication data from the base station or not — 202

(51) Int. Cl.
*H04W 72/0453* (2023.01)
*H04W 72/1263* (2023.01)
*H04W 72/23* (2023.01)

(56) References Cited

U.S. PATENT DOCUMENTS

| | | | |
|---|---|---|---|
| 2010/0267395 A1* | 10/2010 | Wu | H04W 68/02 455/518 |
| 2016/0105907 A1 | 4/2016 | Lee | |
| 2016/0337089 A1 | 11/2016 | Chen | |
| 2016/0374084 A1 | 12/2016 | Zhang | |
| 2017/0230986 A1 | 8/2017 | Moon | |
| 2018/0035311 A1 | 2/2018 | Yang et al. | |
| 2018/0175973 A1 | 6/2018 | Rosa et al. | |
| 2019/0159251 A1 | 5/2019 | Li et al. | |
| 2020/0337072 A1* | 10/2020 | Lunttila | H04L 5/0094 |
| 2022/0116152 A1* | 4/2022 | Iyer | H04L 1/188 |

FOREIGN PATENT DOCUMENTS

| | | |
|---|---|---|
| CN | 105682241 A | 6/2016 |
| CN | 107347002 A | 11/2017 |
| CN | 107743695 A | 2/2018 |
| CN | 108696340 A | 10/2018 |
| WO | 2016119454 A1 | 8/2016 |
| WO | 2016198734 A1 | 12/2016 |
| WO | 2017186174 A1 | 11/2017 |

OTHER PUBLICATIONS

International Search Report in the international application No. PCT/CN2018/112928, dated May 29, 2019.
Written Opinion of the International Search Authority in the international application No. PCT/CN2018/112928, dated May 29, 2019.
3GPP TSG RAN WG1 #96 R1-1902908, Athens, Greece, Feb. 25-Mar. 1, 2019, Agenda item: 7.2.2.2.3, Source: Xiaomi, Title: HARQ enhancement for NR-U, Document for: Discussion.
Supplementary European Search Report in the European application No. 18938932.3, dated Oct. 20, 2021.
3GPP TSG RAN WG1 meeting #85 R1-164496, Nanjing, China, May 23-27, 2016; Agenda Item: 6.2.1.1; Source: LG Electronics; Title: Multi-subframe scheduling in LAA.
Huawei, HiSilicon, "HARQ enhancements in NR unlicensed", 3GPP TSG RAN WG1 Meeting #93 R1-1805918, May 21-May 25, 2018, the whole document, 5 pages.

* cited by examiner

DATA TRANSMISSION METHOD AND DEVICE, BASE STATION, TERMINAL AND STORAGE MEDIUM

CROSS-REFERENCE TO RELATED APPLICATION

This application is a U.S. national stage of International Application No. PCT/CN2018/112928 filed on Oct. 31, 2018, the disclosure of which is hereby incorporated by reference in its entirety.

TECHNICAL FIELD

The present disclosure generally relates to the technical field of communication, and more particularly, to a data transmission method and device, a base station, a terminal and a storage medium.

BACKGROUND

In a wireless communication system, a time varying characteristic and multipath fading of a wireless channel may impact data transmission and cause a data transmission failure. Therefore, for ensuring the reliability of data transmission, a Hybrid-Automatic Repeat reQuest (HARQ) mechanism is introduced. After a transmitter transmits communication data to a receiver, the receiver may detect whether the communication data is correctly received or not, acquire feedback data based on a detection result and transmit the feedback data to the transmitter, such that the transmitter may determine whether to retransmit the communication data or continue to transmit a next piece of communication data based on the feedback data.

The HARQ mechanism may be applied to data transmission implemented between a base station and a terminal through a licensed channel. The base station may transmit a scheduling instruction to the terminal through the licensed channel, the scheduling instruction including information of a resource position configured for the terminal to transmit feedback data in the licensed channel. The terminal receives the scheduling instruction and may determine the resource position based on the scheduling instruction. The base station may transmit communication data to the terminal through the licensed channel. The terminal, after receiving the communication data and acquiring feedback data of the communication data, may transmit the feedback data at the resource position such that the base station can determine whether to retransmit the communication data or continue to transmit a next piece of communication data based on the feedback data.

With the gradual increase of service requirements, licensed channels already cannot meet transmission requirements. Data transmission through an unlicensed channel has been proposed accordingly. However, a terminal has to contend for an unlicensed channel to transmit feedback data. If the terminal fails in the contention for the unlicensed channel, the feedback data cannot be transmitted. Therefore, the HARQ mechanism is not available for an unlicensed channel.

SUMMARY

The present disclosure provides a data transmission method and device, a base station, a terminal and a storage medium, which may solve the problem in related art. The technical solutions are implemented as follows.

According to a first aspect of embodiments of the present disclosure, a data transmission method is provided, which may be implemented by a base station and include that:
a control instruction is transmitted to a terminal, the control instruction carrying indication information and the indication information indicating multiple resource positions configured for the terminal to transmit feedback data in an unlicensed channel; and
feedback data transmitted by the terminal is received, the feedback data being transmitted by the terminal through at least one resource position among the multiple resource positions in a case of the unlicensed channel being occupied by the terminal and the feedback data indicating whether the terminal has correctly received communication data from the base station or not.

In a possible implementation, the operation that the control instruction is transmitted to the terminal may include that:
a scheduling instruction is transmitted to the terminal.

In another possible implementation, the indication information may be an index identifier; and the method may further include that:
an index table is transmitted to the terminal, the index table including multiple resource positions corresponding to each index identifier and the index table being configured to query corresponding multiple resource positions based on any index identifier.

In another possible implementation, the communication data may include multiple data sets; and the operation that the feedback data transmitted by the terminal is received may include that:
the feedback data corresponding to the multiple data sets is received through the multiple resource positions.

In another possible implementation, the indication information may be in an information field at a fixed position in the control instruction or in a configurable information field of the control instruction; and
a bit length of the indication information may be fixed or may be determined based on a configuration.

In another possible implementation, the indication information may include time-domain information and frequency-domain information of the multiple resource positions; or,
the indication information may include time-domain information of the multiple resource positions, and frequency-domain information of the multiple resource positions may be determined according to a first preset rule; or,
the indication information may include frequency-domain information of the multiple resource positions, and time-domain information of the multiple resource positions may be determined according to a second preset rule.

According to a second aspect of the embodiments of the present disclosure, a data transmission method is provided, which may be implemented by a terminal and include that:
a control instruction transmitted by a base station is received, the control instruction carrying indication information and the indication information indicating multiple resource positions configured for the terminal to transmit feedback data in an unlicensed channel;
the multiple resource positions are determined based on the indication information; and
feedback data is transmitted through at least one resource position among the multiple resource positions in a case of the unlicensed channel being occupied by the terminal, the feedback data indicating whether the terminal has correctly received communication data from the base station or not.

In a possible implementation, the operation that the control instruction transmitted by the base station is received may include that:

a scheduling instruction transmitted by the base station is received.

In another possible implementation, the indication information may be an index identifier; and the operation that the multiple resource positions are determined based on the indication information may include that:

an index table is queried based on the index identifier to determine the multiple resource positions corresponding to the index identifier, the index table including multiple resource positions corresponding to each index identifier.

In another possible implementation, the operation that the feedback data is transmitted through the at least one resource position among the multiple resource positions in the case of the unlicensed channel being occupied by the terminal may include that:

the feedback data is transmitted through one resource position after a successful occupation time among the multiple resource positions in the case of the unlicensed channel being occupied by the terminal; or, the feedback data is transmitted through a preset number of resource positions after a successful occupation time among the multiple resource positions respectively; or, the feedback data is transmitted through each resource position after a successful occupation time among the multiple resource positions respectively.

In another possible implementation, the communication data may include multiple data sets; and the operation that the feedback data is transmitted through the at least one resource position among the multiple resource positions in the case of the unlicensed channel being occupied by the terminal may include that:

the feedback data corresponding to the multiple data sets is transmitted through multiple resource positions after a successful occupation time in the unlicensed channel in the case of the unlicensed channel being occupied by the terminal.

In another possible implementation, the operation that the feedback data is transmitted through the at least one resource position among the multiple resource positions under the condition of successfully occupying the unlicensed channel may include that:

in response to acquiring the feedback data, multiple resource positions within a time bucket after present time and an unlicensed channel where the multiple resource positions are located are determined; and the feedback data is transmitted through a resource position in the unlicensed channel in the case of the unlicensed channel being occupied by the terminal.

In another possible implementation, the indication information may be in an information field at a fixed position in the control instruction or in a configurable information field of the control instruction; and a bit length of the indication information may be fixed or may be determined based on a configuration.

In another possible implementation, the indication information may include time-domain information and frequency-domain information of the multiple resource positions; or, the indication information may include time-domain information of the multiple resource positions, and frequency-domain information of the multiple resource positions may be determined according to a first preset rule; or, the indication information may include frequency-domain information of the multiple resource positions, and time-domain information of the multiple resource positions may be determined according to a second preset rule.

According to a third aspect of the embodiments of the present disclosure, a data transmission device is provided, which may be implemented by a base station and include:

a first transmitting module, configured to transmit a control instruction to a terminal, the control instruction carrying indication information and the indication information indicating multiple resource positions configured for the terminal to transmit feedback data in an unlicensed channel; and a receiving module, configured to receive feedback data from the terminal, the feedback data being transmitted by the terminal through at least one resource position among the multiple resource positions in a case of the unlicensed channel being occupied by the terminal and the feedback data indicating whether the terminal has correctly received communication data from the base station or not.

In a possible implementation, the first transmitting module may include:

a transmission unit, configured to transmit a scheduling instruction to the terminal.

In another possible implementation, the indication information may be an index identifier; and the device may further include:

a second transmitting module, configured to transmit an index table to the terminal, the index table including multiple resource positions corresponding to each index identifier and the index table being configured to query corresponding multiple resource positions based on any index identifier.

In another possible implementation, the communication data may include multiple data sets; and the receiving module may include:

a receiving unit, configured to receive the feedback data corresponding to the multiple data sets through the multiple resource positions.

In another possible implementation, the indication information may be in an information field at a fixed position in the control instruction or in a configurable information field of the control instruction; and a bit length of the indication information may be fixed or may be determined based on a configuration.

In another possible implementation, the indication information may include time-domain information and frequency-domain information of the multiple resource positions; or, the indication information may include time-domain information of the multiple resource positions, and frequency-domain information of the multiple resource positions may be determined according to a first preset rule; or, the indication information may include frequency-domain information of the multiple resource positions, and time-domain information of the multiple resource positions may be determined according to a second preset rule.

According to a fourth aspect of the embodiments of the present disclosure, a data transmission device is provided, which may be implemented by a terminal and include:

a receiving module, configured to receive a control instruction from a base station, the control instruction carrying indication information and the indication information indicating multiple resource positions configured for the terminal to transmit feedback data in an unlicensed channel;

a first determining module, configured to determine the multiple resource positions based on the indication information; and a transmitting module, configured to transmit the feedback data through at least one resource position among the multiple resource positions in a case of the unlicensed channel being occupied by the terminal, the feedback data indicating whether the terminal has correctly received communication data from the base station or not.

In a possible implementation, the receiving module may include:

a receiving unit, configured to receive a scheduling instruction from the base station.

In another possible implementation, the indication information may be an index identifier; and the device may further include:

a second determining module, configured to query an index table based on the index identifier to determine the multiple resource positions corresponding to the index identifier, the index table including multiple resource positions corresponding to each index identifier.

In a possible implementation, the transmitting module may include:

a first transmission unit, configured to transmit the feedback data through one resource position after a successful occupation time among the multiple resource positions in the case of the unlicensed channel being occupied by the terminal; or, a second transmission unit, configured to transmit the feedback data through a preset number of resource positions after a successful occupation time among the multiple resource positions respectively; or, a third transmission unit, configured to transmit the feedback data through each resource position after a successful occupation time among the multiple resource positions respectively.

In another possible implementation, the communication data may include multiple data sets; and the transmitting module may include:

a fourth transmission unit, configured to transmit the feedback data corresponding to the multiple data sets through multiple resource positions after a successful occupation time in the unlicensed channel in the case of the unlicensed channel being occupied by the terminal.

In another possible implementation, the transmitting module may further be configured to, in response to acquiring the feedback data, determine multiple resource positions within a time bucket after present time and an unlicensed channel where the multiple resource positions are located, and transmit the feedback data through a resource position in the unlicensed channel in the case of the unlicensed channel being occupied by the terminal.

In another possible implementation, the indication information may be in an information field at a fixed position in the control instruction or in a configurable information field of the control instruction; and a bit length of the indication information may be fixed or may be determined based on a configuration.

In another possible implementation, the indication information may include time-domain information and frequency-domain information of the multiple resource positions; or, the indication information may include time-domain information of the multiple resource positions, and frequency-domain information of the multiple resource positions may be determined according to a first preset rule; or, the indication information may include frequency-domain information of the multiple resource positions, and time-domain information of the multiple resource positions may be determined according to a second preset rule.

According to a fifth aspect of the embodiments of the present disclosure, a base station is provided, which may include:

a processor; and memory configured to store instructions executable by the processor, wherein the processor may be configured to:

transmit a control instruction to a terminal, the control instruction carrying indication information and the indication information indicating multiple resource positions configured for the terminal to transmit feedback data in an unlicensed channel; and receive feedback data from the terminal, the feedback data being transmitted by the terminal through at least one resource position among the multiple resource positions in a case of the unlicensed channel being occupied by the terminal and the feedback data indicating whether the terminal has correctly received communication data from the base station or not.

According to a sixth aspect of the embodiments of the present disclosure, a terminal is provided, which may include:

a processor; and memory configured to store instructions executable by the processor, wherein the processor may be configured to:

receive a control instruction from a base station, the control instruction carrying indication information and the indication information indicating multiple resource positions configured for the terminal to transmit feedback data in an unlicensed channel;

determine the multiple resource positions based on the indication information; and transmit feedback data through at least one resource position among the multiple resource positions in a case of the unlicensed channel being occupied by the terminal, the feedback data indicating whether the terminal has correctly received communication data from the base station or not.

According to a seventh aspect of the embodiments of the present disclosure, a computer-readable storage medium is provided, in which at least one instruction may be stored, wherein the at least one instruction may be loaded and executed by a processor to implement the operations in the data transmission method as described in the first aspect.

According to an eighth aspect of the embodiments of the present disclosure, a computer-readable storage medium is provided, in which at least one instruction may be stored, wherein the at least one instruction may be loaded and executed by a processor to implement the operations in the data transmission method as described in the second aspect.

According to the method, device, base station, terminal and storage medium provided in the embodiments of the present disclosure, the base station may transmit a control instruction to the terminal, the control instruction carrying indication information and the indication information indicating multiple resource positions configured for the terminal to transmit feedback data in an unlicensed channel, so that multiple opportunities are provided for the terminal to transmit feedback data. Under the condition that the terminal occupies the unlicensed channel, the feedback data may be transmitted through at least one resource position among the multiple resource positions, thereby avoiding a situation that the terminal successfully occupies the unlicensed channel but has missed resource positions and thus cannot transmit the feedback data. A success rate of transmitting feedback data by a terminal through an unlicensed channel is increased, and furthermore, the reliability of data transmission is improved.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

For making the purposes, technical solutions and advantages of the present disclosure clearer, the present disclosure will further be described below in combination with implementations and accompanying drawings in detail. Herein, schematic implementations of the present disclosure and descriptions thereof are adopted to explain the present disclosure and not intended to limit the present disclosure.

The embodiments of the present disclosure provide a data transmission method and device, a base station, a terminal and a storage medium. The present disclosure will be described below in combination with the accompanying drawings in detail.

Figure 1:
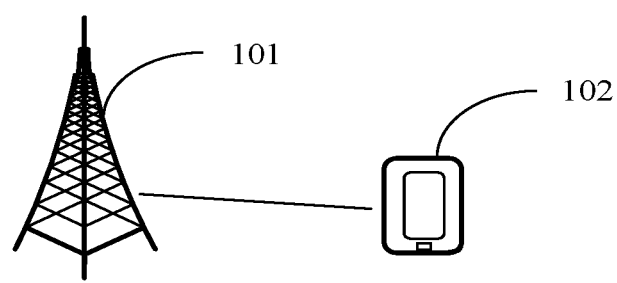
FIG. 1 is a structure diagram of a communication system according to an exemplary embodiment.

FIG. 1 is a structure diagram of a communication system according to an exemplary embodiment. As shown in FIG. 1, the communication system includes a base station 101 and a terminal 102. The base station 101 may be connected with the terminal 102 through a communication network.

In a communication process, the base station 101 may transmit communication data to the terminal 102, and the terminal 102 may receive the communication data, detect whether the communication data is correctly received or not, acquire feedback data based on a detection result and transmit the feedback data to the base station 101 such that the base station 101 can determine whether to retransmit the communication data or continue to transmit a next piece of communication data based on the feedback data.

In the embodiments of the present disclosure, for applying a process that the terminal 102 transmits feedback data to an unlicensed channel to increase frequency-domain resources for data transmission, the base station 101 may transmit a control instruction to the terminal 102, the control instruction carrying indication information and the indication information indicating multiple resource positions configured for the terminal 102 to transmit the feedback data in the unlicensed channel, and then the terminal 102 may transmit the feedback data through at least one resource position among the multiple resource positions in a case of the unlicensed channel being occupied by the terminal.

The base station 101 may transmit the communication data to the terminal 102 through a licensed channel, or may transmit the communication data to the terminal 102 through an unlicensed channel after successfully occupying the unlicensed channel. The unlicensed channel adopted when the terminal 102 transmits feedback data may be the same as or different from a channel adopted when the base station 101 transmits communication data.

Figure 2:
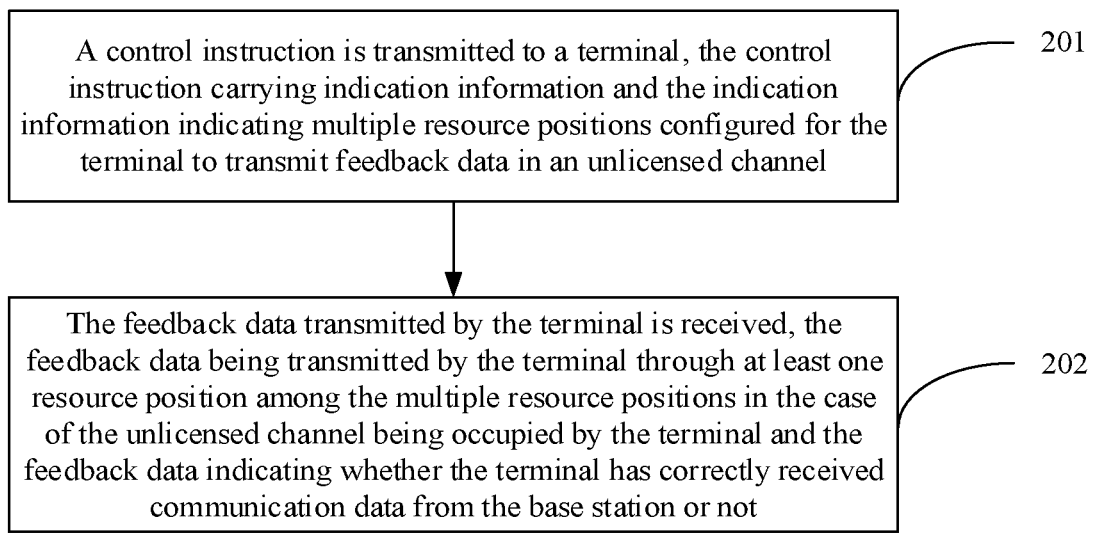
FIG. 2 is a flow chart of a data transmission method according to an exemplary embodiment.

FIG. 2 is a flow chart of a data transmission method according to an exemplary embodiment. The method is implemented by a base station. As shown in FIG. 2, the method includes the following operations.

In Operation 201, a control instruction is transmitted to a terminal, the control instruction carrying indication information and the indication information indicating multiple resource positions configured for the terminal to transmit feedback data in an unlicensed channel.

In Operation 202, the feedback data transmitted by the terminal is received, the feedback data being transmitted by the terminal through at least one resource position among the multiple resource positions in a case of the unlicensed channel being occupied by the terminal and the feedback data indicating whether the terminal has correctly received communication data from the base station or not.

According to the method provided in the embodiment of the present disclosure, a base station may transmit a control instruction to a terminal, the control instruction carrying indication information and the indication information indicating multiple resource positions configured for the terminal to transmit feedback data in an unlicensed channel, so that multiple opportunities are provided for the terminal to transmit feedback data. Under the condition that the terminal occupies the unlicensed channel, the feedback data may be transmitted through at least one resource position among the multiple resource positions. Therefore, the situation that a terminal successfully occupies an unlicensed channel but misses resource positions and thus cannot transmit feedback data is can be avoided, a success rate of transmitting the feedback data by the terminal through the unlicensed channel is increased, and furthermore, the reliability of data transmission is improved.

In a possible implementation, the operation that the indication information is transmitted to the terminal may include that: a scheduling instruction is transmitted to the terminal.

In another possible implementation, the indication information may be an index identifier.

The method may further include that:
an index table is transmitted to the terminal, the index table including multiple resource positions corresponding to each index identifier and the index table being configured to query corresponding multiple resource positions based on any index identifier.

In another possible implementation, the communication data may include multiple data sets.

The operation that the feedback data transmitted by the terminal is received may include that:
the feedback data corresponding to the multiple data sets is received through the multiple resource positions.

In another possible implementation, the indication information may be in an information field at a fixed position in the control instruction or in a configurable information field of the control instruction.

A bit length of the indication information may be fixed or may be determined based on a configuration.

In another possible implementation, the indication information may include time-domain information and frequency-domain information of the multiple resource positions; or,
the indication information may include time-domain information of the multiple resource positions, and frequency-domain information of the multiple resource positions may be determined according to a first preset rule; or,
the indication information may include frequency-domain information of the multiple resource positions, and time-domain information of the multiple resource positions may be determined according to a second preset rule.

Figure 3:
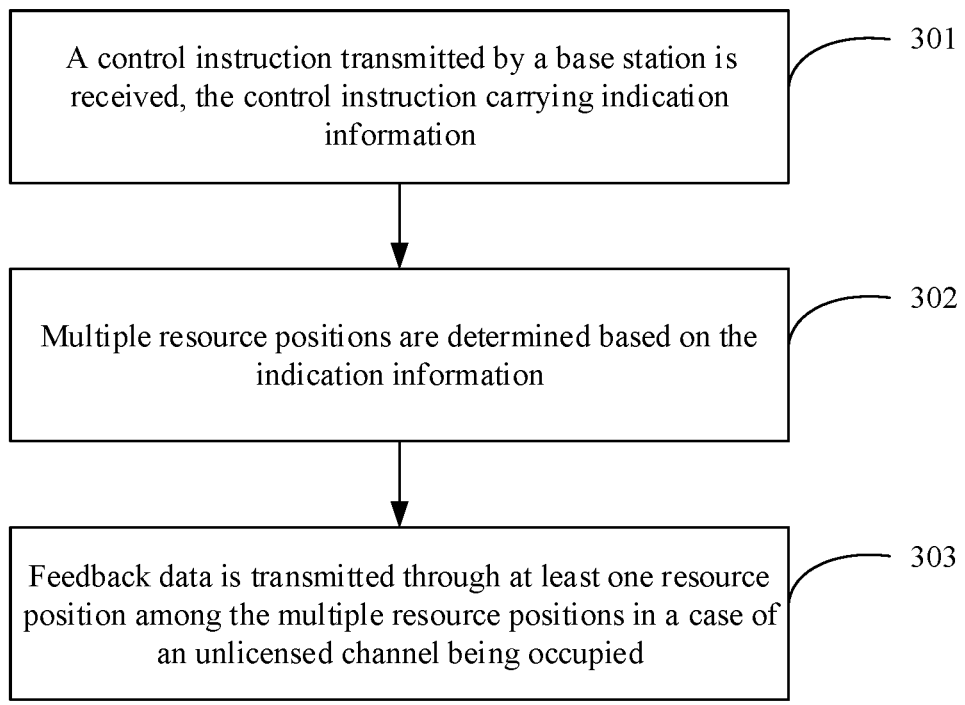
FIG. 3 is a flow chart of a data transmission method according to an exemplary embodiment.

FIG. 3 is a flow chart of a data transmission method according to an exemplary embodiment. The method is implemented by a terminal. As shown in FIG. 3, the data transmission method includes the following operations.

In Operation 301, a control instruction transmitted by a base station is received, the control instruction carrying indication information and the indication information indicating multiple resource positions configured for the terminal to transmit feedback data in an unlicensed channel.

In Operation 302, the multiple resource positions are determined based on the indication information.

In Operation 303, the feedback data is transmitted through at least one resource position among the multiple resource positions in a case of the unlicensed channel being occupied by the terminal, the feedback data indicating whether the terminal has correctly received communication data from the base station or not.

According to the method provided in the embodiment of the present disclosure, a terminal may receive a control instruction from a base station, the control instruction carrying indication information and the indication information indicating multiple resource positions configured for the terminal to transmit feedback data in an unlicensed channel, so that multiple opportunities are provided for the terminal to transmit feedback data. Under the condition that the terminal occupies the unlicensed channel, the feedback data may be transmitted through at least one resource position among the multiple resource positions. Therefore, the situation that a terminal successfully occupies an unlicensed channel but misses resource positions and thus cannot transmit feedback data may be avoided. A success rate of transmitting feedback data by a terminal through an unlicensed channel is increased, and furthermore, the reliability of data transmission is improved.

In a possible implementation, the operation that the control instruction transmitted by the base station is received may include that:
a scheduling instruction transmitted by the base station is received.

In another possible implementation, the indication information may be an index identifier.

The operation that the multiple resource positions are determined based on the indication information may include that:
an index table is queried based on the index identifier to determine the multiple resource positions corresponding to the index identifier, the index table including multiple resource positions corresponding to each index identifier.

In another possible implementation, the operation that the feedback data is transmitted through the at least one resource position among the multiple resource positions in the case of the unlicensed channel being occupied by the terminal may include that:
the feedback data is transmitted through one resource position after a successful occupation time among the multiple resource positions in the case of the unlicensed channel being occupied by the terminal; or,
the feedback data is transmitted through a preset number of resource positions after a successful occupation time among the multiple resource positions respectively; or,
the feedback data is transmitted through each resource position after a successful occupation time among the multiple resource positions respectively.

In another possible implementation, the communication data may include multiple data sets.

The operation that the feedback data is transmitted through the at least one resource position among the multiple resource positions in the case of the unlicensed channel being occupied by the terminal may include that:
the feedback data corresponding to the multiple data sets is transmitted through multiple resource positions after a successful occupation time in the unlicensed channel respectively in the case of the unlicensed channel being occupied by the terminal.

In another possible implementation, the operation that the feedback data is transmitted through the at least one resource position among the multiple resource positions in the case of the unlicensed channel being occupied by the terminal may include that:
in response to acquiring the feedback data, multiple resource positions within a time bucket after present time and an unlicensed channel where the multiple resource positions are located are determined; and
the feedback data is transmitted through a resource position in the unlicensed channel in the case of the unlicensed channel being occupied by the terminal.

In another possible implementation, the indication information may be in an information field at a fixed position in the control instruction or in a configurable information field of the control instruction.

A bit length of the indication information may be fixed or may be determined based on a configuration.

In another possible implementation, the indication information may include time-domain information and frequency-domain information of the multiple resource positions; or,
the indication information may include time-domain information of the multiple resource positions, and frequency-domain information of the multiple resource positions may be determined according to a first preset rule; or, the indication information may include frequency-domain information of the multiple resource positions, and the time-domain information of the multiple resource positions may be determined according to a second preset rule.

In related art, a HARQ mechanism may be applied to data transmission implemented between a base station and a terminal through a licensed channel. However, with the gradual increase of service requirements, licensed channels already cannot meet transmission requirements. Data transmission carried out through an unlicensed channel is proposed.

A base station or a terminal, when intending to perform data transmission through an unlicensed channel, is required to contend for the unlicensed channel. Namely a state of the unlicensed channel is detected at first. The unlicensed channel may be occupied when the unlicensed channel is in an idle state. Then, data may be transmitted through the unlicensed channel. In a case that the terminal fails to occupy the unlicensed channel, data cannot be transmitted. Therefore, the HARQ mechanism is not available for an unlicensed channel.

In the embodiments of the present disclosure, the HARQ mechanism is applied to an unlicensed channel. A base station may configure multiple resource positions in the unlicensed channel for a terminal to transmit feedback data, namely multiple opportunities are provided for the terminal to transmit the feedback data. In such a manner, even though the terminal fails to occupy the unlicensed channel, the feedback data still can be transmitted through a resource position after successful occupation of the unlicensed channel. Therefore, the success rate of transmitting feedback data is increased. Details about a specific process refer to the following method embodiments.

Figure 4:
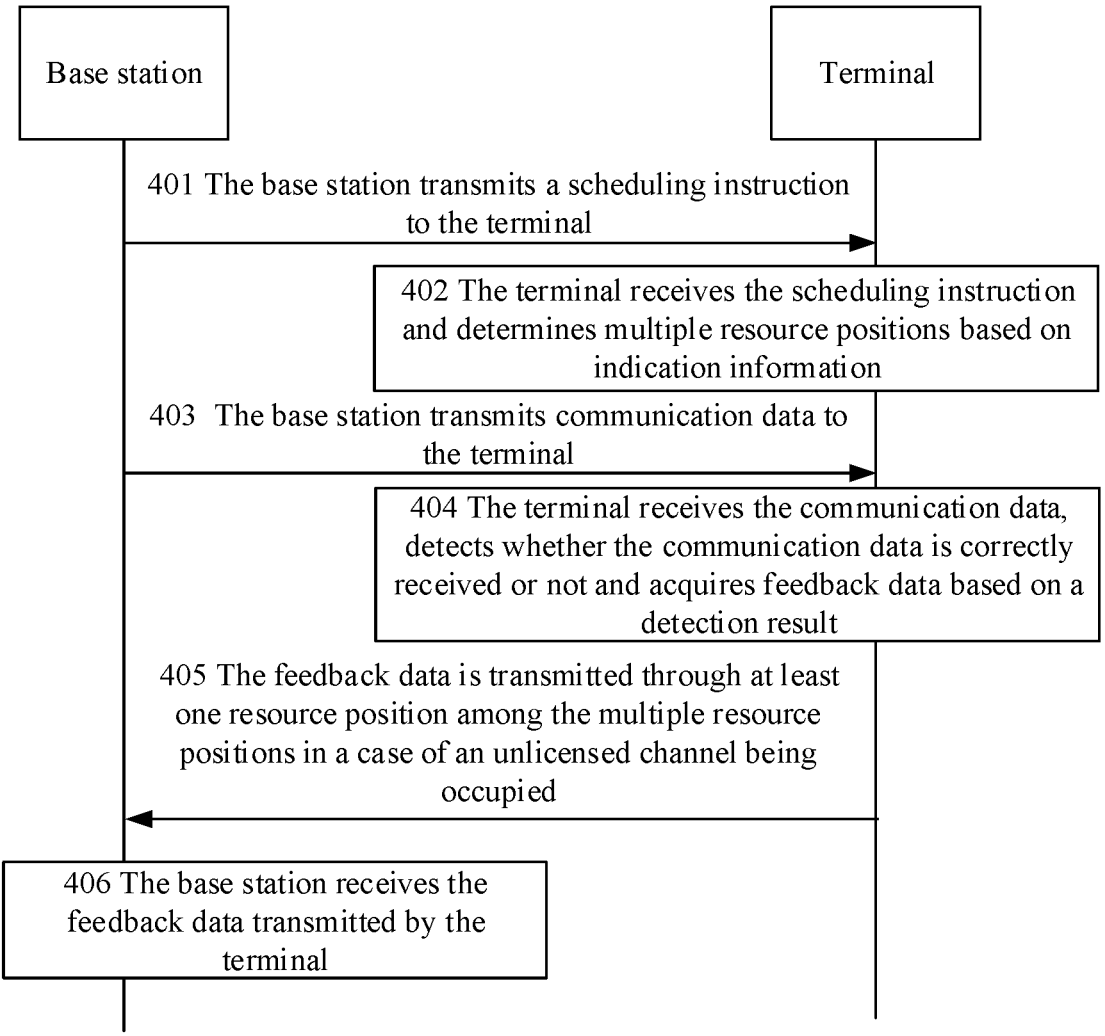
FIG. 4 is a flow chart of a data transmission method according to an exemplary embodiment.

FIG. 4 is a flow chart of a data transmission method according to an exemplary embodiment. A base station and a terminal are interaction bodies. Descriptions are made in the embodiment taking a case that indication information includes multiple resource positions as an example. As shown in FIG. 4, the method includes the following operations.

In Operation 401, the base station transmits a scheduling instruction to the terminal.

In the embodiment of the present disclosure, the base station, when performing data transmission with the terminal, may transmit communication data to the terminal, and the terminal then may receive the communication data. In such a case, for ensuring the reliability of the data transmission, the terminal may detect whether the communication data is correctly received or not, acquire feedback data based on a detection result and transmit the feedback data to the base station. The base station may receive the feedback data and determine whether to retransmit the communication data or continue to transmit a next piece of communication data based on the feedback data.

The feedback data may indicate whether the terminal has correctly received the communication data or not. In a case that the terminal does not correctly receive the communication data, the feedback data may also indicate a position of error data in the communication data, an error cause and the like.

For making it convenient for the terminal to transmit feedback data, the base station may transmit a scheduling instruction to the terminal, the scheduling instruction carrying indication information and the indication information indicating multiple resource positions configured for the terminal to transmit the feedback data in an unlicensed channel. The terminal, when receiving the indication information, may determine multiple resource positions configured to transmit the feedback data based on the indication information.

Each resource position in time domain may be a slot, a subframe, a frame or another time-domain unit.

Figure 5:
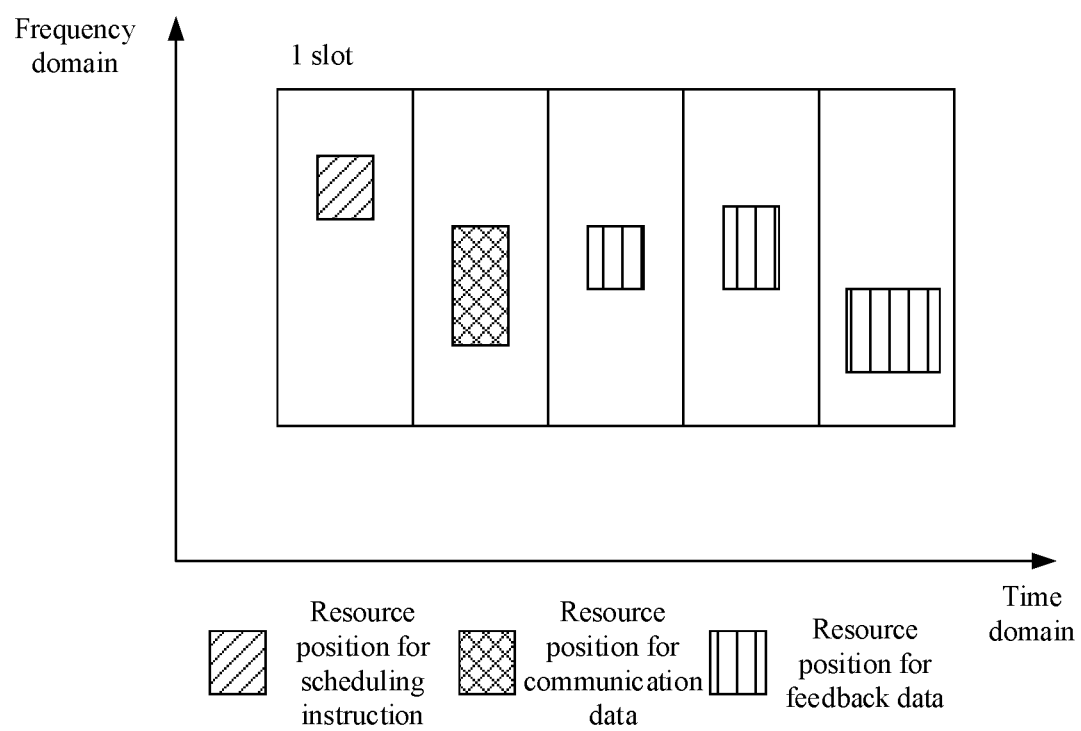
FIG. 5 is a schematic diagram illustrating resource positions according to an exemplary embodiment.

In addition, the scheduling instruction may also carry a resource position configured for the base station to transmit the communication data. In such a case, the base station subsequently transmits the communication data to the terminal through the resource position, and the terminal may determine the resource position based on the scheduling instruction and receive the communication data from the base station through the resource position. For example, the resource positions for transmitting the scheduling instruction, the communication data and the feedback data may be shown in FIG. 5.

It is to be noted that descriptions are made in the embodiment of the present disclosure by taking a condition of carrying the indication information in the scheduling instruction by the base station for transmission as an example. In another embodiment, the base station may transmit a control instruction to the terminal, the control instruction carrying the indication information. The control instruction may be the scheduling instruction, or may also be a control instruction of another type.

In a possible implementation, the base station, when transmitting a control instruction, may transmit the control instruction through a licensed channel. Or the base station may occupy an unlicensed channel and transmit the control instruction through the unlicensed channel.

In another possible implementation, the base station, when transmitting the control instruction, may add the indication information to an information field at a fixed position in the control instruction to make the indication information in the information field at the fixed position in the control instruction. The terminal, when receiving the control instruction, can acquire the indication information more conveniently and quickly from the information field at the fixed position in the control instruction. A bit length of the indication information may be determined based on a configuration or may be fixed.

In another possible implementation, the base station may flexibly configure an information field for the indication information. When transmitting the control instruction, the base station may add the indication information to the configured information field in the control instruction to make the indication information in the configurable information field of the control instruction. The terminal, when receiving the control instruction, can acquire the indication information from the present configured information field. The bit length of the indication information may be fixed or may be determined based on the configuration.

In such manners, an information field of the indication information may be extended in the control instruction to transmit the indication information and make it convenient for the base station to flexibly configure for the terminal the resource positions for transmitting feedback data.

In Operation 402, the terminal receives the scheduling instruction and determines multiple resource positions based on indication information.

The terminal, after receiving the scheduling instruction, may acquire the indication information in the scheduling instruction and determine the multiple resource positions configured to transmit feedback data based on the indication information. In the embodiment of the present disclosure, the condition that the indication information includes the multiple resource positions is taken as an example. The terminal, after acquiring the indication information in the scheduling instruction, may directly determine the multiple resource positions.

In a possible implementation, the indication information may include time-domain information and frequency-domain information of the multiple resource positions, and corresponding resource positions may be determined based on the time-domain information and the frequency-domain information. The time-domain information represents a time bucket where the resource position is. For example, the time-domain information may be a slot, symbol, subframe or frame, etc., where the resource position is. The frequency-domain information represents a frequency-domain range where the resource position is, and the unit of the frequency-domain range may be subcarrier, Resource Block (RB), etc.

For the multiple resource positions, different resource positions may have the same or different time-domain information and the same or different frequency-domain information as long as it is ensured that either the time-domain information or the frequency-domain information is not completely the same.

When the indication information includes information about multiple resource positions in the same unlicensed channel and the multiple resource positions have different time-domain information, the terminal may transmit the feedback data through resource positions in the unlicensed channel at multiple time points. Or, when the indication information includes information about multiple resource positions in the same time bucket and the multiple resource positions have different frequency-domain information and are in different unlicensed channels, the terminal, when intending to transmit feedback data at a certain time point, may select a resource position for transmitting the feedback data based on unlicensed channels where the multiple resource positions are and a state of each of the unlicensed channels.

In another possible implementation, the indication information may include the time-domain information of the multiple resource positions, and the frequency-domain information of the multiple resource positions may be determined according to a first preset rule. The first preset rule is a rule of determining frequency-domain information based on time-domain information of a resource position. The first preset rule may be predefined by the base station and the terminal, or may also be pre-configured for the terminal by the base station through signaling.

The first preset rule may include preset frequency-domain information to specify an unlicensed channel configured for the terminal to transmit feedback data. Or, the first preset rule may include a fixed offset to instruct frequency-domain information of a resource position to be determined every time based on the offset. In such a case, the frequency-domain information of the resource position is increased or decreased by the fixed offset every time according to a sequence of the time-domain information of the multiple resource positions, thereby determining the frequency-domain information of each resource position. For example, a band of each resource position and a band of the next resource position differ fixedly by 5 MHZ.

Or, the first preset rule may also be calculating frequency-domain information of a resource position based on time-domain information of the resource position. A calculation manner may be predefined by the base station and the terminal or configured for the terminal by the base station through signaling. For example, the first preset rule may include a corresponding relationship between time-domain information and frequency-domain information. Every time when time-domain information of a resource position is acquired, the corresponding relationship may be queried to acquire corresponding frequency-domain information.

In another possible implementation, the indication information may include the frequency-domain information of the multiple resource positions, and the time-domain information of the multiple resource positions may be determined according to a second preset rule. The second preset rule is a rule of determining time-domain information based on frequency-domain information of a resource position. The second preset rule may be predefined by the base station and the terminal, or may also be pre-configured for the terminal by the base station through signaling.

The second preset rule may include preset time-domain information to specify a time bucket configured for the terminal to transmit feedback data. Or, the second preset rule may include a fixed offset to instruct time-domain information of a resource position to be determined every time based on the offset. In such a case, the time-domain information of the resource position is increased or decreased by the fixed offset every time according to a sequence of the frequency-domain information of the multiple resource positions, thereby determining the time-domain information of each resource position. For example, a time bucket of each resource position and a time bucket of the next resource position differ fixedly by 0.1 seconds.

Or, the second preset rule may also be calculating time-domain information of a resource position based on frequency-domain information of a resource position. A calculation manner may be predefined by the base station and the terminal or configured for the terminal by the base station through signaling. For example, the second preset rule may include a corresponding relationship between frequency-domain information and time-domain information. Every time when frequency-domain information of a resource position is acquired, the corresponding relationship may be queried to acquire corresponding time-domain information.

In Operation 403, the base station transmits communication data to the terminal.

The resource position for the communication data may be carried in the scheduling instruction by the base station and the communication data may be transmitted to the terminal by the base station through the resource position. The terminal may receive the communication data through the resource position. In addition, The resource position for the communication data may be carried in another control instruction by the base station, the another control instruction may be transmitted by the base station to the terminal, and the communication data may be transmitted to the terminal through the resource position.

In a possible implementation, the base station may divide the communication data into multiple data sets and transmit the multiple data sets to the terminal through one or more resource positions. When the communication data are divided into the multiple data sets, a sequence identifier may be added to each data set, the sequence identifier representing a sequence of a data set in the communication data.

In Operation 404, the terminal receives the communication data, detects whether the communication data is correctly received or not and acquires feedback data based on a detection result.

In a possible implementation, when the communication data includes the multiple data sets, the terminal may detect whether each data set in the communication data is correctly received or not, thereby obtaining feedback data of each data set. In such a case, a sequence identifier matched with a data set may be added to each piece of feedback data, so that the acquired feedback data can clearly indicate whether each data set is successfully transmitted or not, and the base station, after acquiring the feedback data, may pertinently process each data set.

In Operation 405, the feedback data is transmitted through at least one resource position among the multiple resource positions in a case of an unlicensed channel being occupied.

The terminal, after acquiring the feedback data, may detect whether the unlicensed channel including the multiple resource positions configured to transmit the feedback data is in the idle state or not. When the unlicensed channel is in the idle state, the terminal may occupy the unlicensed channel and transmit the feedback data through at least one resource position among the multiple resource positions in the case of the unlicensed channel being occupied by the terminal. When the unlicensed channel is in a busy state, the terminal cannot occupy the unlicensed channel. In such a case, the terminal may keep waiting until the unlicensed channel is changed to the idle state and transmit the feedback data through at least one resource position among the multiple resource positions in the case of the unlicensed channel being occupied by the terminal.

Operation 405 may include any one of the following operations 4051 to 4055.

In the operation 4051, the feedback data is transmitted through one resource position after a successful occupation time among the multiple resource positions in the case of the unlicensed channel being occupied by the terminal.

The successful occupation time refers to a time when the terminal successfully occupies the unlicensed channel.

The base station may provide multiple resource positions for the terminal to ensure that there are still tome resource positions after the successful occupation time as much as possible and the terminal may transmit the feedback data through one of the resource positions after the successful occupation time. For example, the feedback data may be transmitted through a first resource position after the successful occupation time to save transmission time.

In the operation 4052, the feedback data is transmitted through a preset number of resource positions after a successful occupation time among the multiple resource positions respectively.

When there are multiple resource positions after the successful occupation time, the feedback data may be transmitted through the preset number of resource positions after the successful occupation time respectively, namely multiple copies of the feedback data are transmitted to the base station, to prevent loss of the feedback data and improve the reliability of data transmission.

The preset number may be predefined by the base station and the terminal or may also be transmitted to the terminal in advance by the base station through signaling.

In operation 4053, the feedback data is transmitted through each resource position after a successful occupation time among the multiple resource positions respectively.

When there are multiple resource positions after the successful occupation time, the feedback data may be transmitted through each resource position after the successful occupation time respectively, namely multiple copies of the feedback data are transmitted to the base station, to prevent loss of the feedback data and improve the reliability of data transmission.

In the operation 4054, feedback data corresponding to multiple data sets is transmitted through multiple resource positions after a successful occupation time in the unlicensed channel in the case of the unlicensed channel being occupied by the terminal.

When the terminal acquires the feedback data corresponding to the multiple data sets in the communication data and there are multiple resource positions after the successful occupation time, multiple sets of feedback data may be distributed to the multiple resource positions for transmission.

For example when one set of feedback data is transmitted at a resource position, multiple sets of feedback data may be transmitted through resource positions with a quantity equal to that of the data sets respectively. Or, when one or more sets of feedback data are transmitted at a resource position, the multiple sets of feedback data may be transmitted through resource positions with a quantity smaller than that of the data sets. Moreover, the set numbers of the feedback data transmitted at the resource positions may be the same or different.

In addition, when the multiple sets of feedback data are transmitted, a sequence of the multiple sets of feedback data may be determined based on the sequence identifiers of the feedback data, and the feedback data may be allocated according to the sequence of the multiple sets of feedback data and a sequence of the multiple resource positions to ensure that the feedback data with smaller sequence identifiers may be transmitted through the earlier resource positions.

Figure 6:
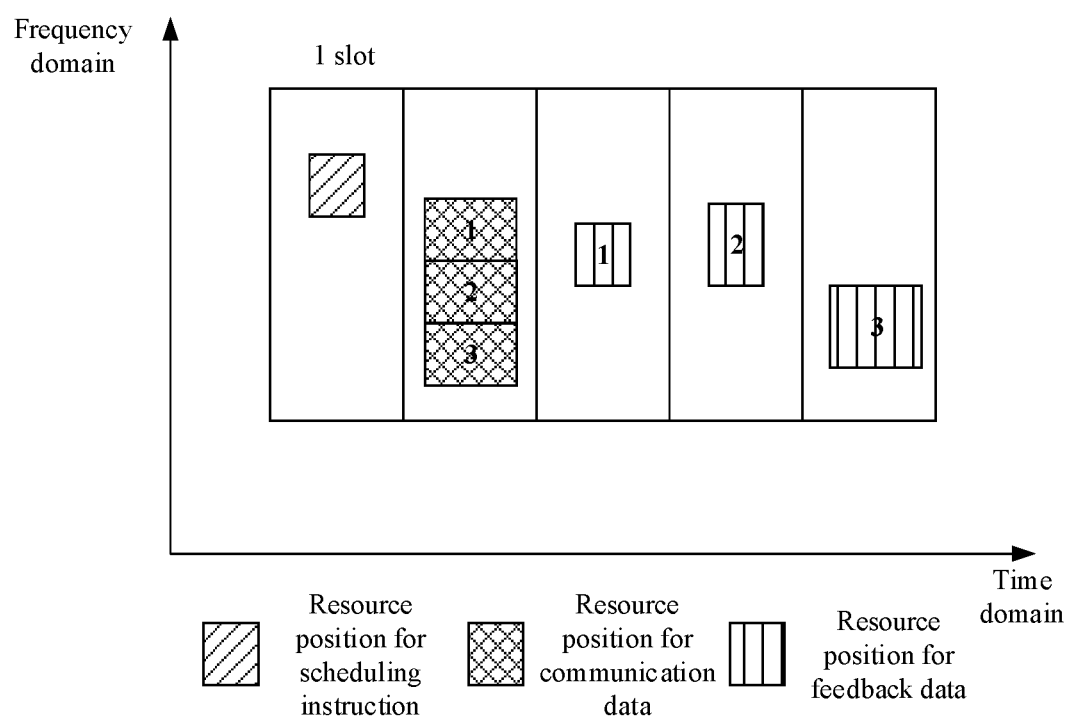
FIG. 6 is another schematic diagram illustrating resource positions according to an exemplary embodiment.

As shown in FIG. 6, the communication data is divided into three data sets: a data set 1, a data set 2 and a data set 3, and there are three resource positions after the successful occupation time: a resource position 1, a resource position 2 and a resource position 3. In such a case, the terminal transmits feedback data of the data set 1 through the resource position 1, transmits feedback data of the data set 2 through the resource position 2 and transmits feedback data of the data set 3 through the resource position 3. Or, the terminal transmits the feedback data of the data set 1 and the data set 2 through the resource position 1, transmits the feedback data of the data set 3 and the data set 1 through the resource position 2 and transmits the feedback data of the data set 2 and the data set 3 through the resource position 3.

It is to be noted that, in the operations 4052 to 4054, after the terminal successfully occupies the unlicensed channel, the feedback data may be transmitted through the multiple resource positions respectively. In a transmission process, the terminal may keep occupying the unlicensed channel, and every time when transmitting feedback data through a resource position, is not required to detect a state of the unlicensed channel again. Or, in the transmission process, every time when transmitting feedback data through a resource position, the terminal may detect the state of the unlicensed channel, occupy the unlicensed channel when determining that the unlicensed channel is in the idle state and release the unlicensed channel after transmitting the feedback data through a resource position in the unlicensed channel. The unlicensed channel may subsequently be reoccupied to transmit feedback data again.

In the operation 4055, in response to acquiring the feedback data, multiple resource positions within a time bucket after present time and an unlicensed channel where the multiple resource positions are located are determined, and the feedback data is transmitted through a resource position in the unlicensed channel in the case of the unlicensed channel being occupied by the terminal.

The terminal, after acquiring the feedback data, may determine resource positions after the present time in the multiple resource positions provided by the base station to determine the multiple resource positions in a time bucket after the present time and the unlicensed channel where the multiple resource positions are located and try to occupy the unlicensed channel. The feedback data may be transmitted through the resource position in the unlicensed channel in the case of the unlicensed channel being occupied by the terminal.

In a possible implementation, the time bucket may be a first time bucket after the present time, and the resource positions are selected from the first time bucket, so that a transmission speed of the feedback data may be increased, and the time for data transmission may be saved.

In another possible implementation, when the multiple resource positions in the time bucket are in multiple unlicensed channels, the terminal may try to occupy one of the unlicensed channels; if failing, the terminal may occupy the next unlicensed channel. When successfully occupying a certain unlicensed channel, the terminal may transmit the feedback data through a resource position in the unlicensed channel that is successfully occupied.

The operation 4055 may also be combined with the operations 4052 to 4054 to form another possible implementation. For example, the terminal, after occupying the unlicensed channel and transmitting the feedback data through a resource position in the time bucket in the unlicensed channel in the operation 4055, may further repeatedly transmit the feedback data through another resource position in the unlicensed channel. Or, the terminal, after occupying the unlicensed channel and transmitting the feedback data of one or more data sets through resource positions in the time bucket in the unlicensed channel in the operation 4055, may further transmit the feedback data of another data set through another resource position in the unlicensed channel.

In Operation 406, the base station receives the feedback data from the terminal.

In a possible implementation, when the terminal transmits the feedback data through one of the resource positions, the base station may sequentially detect the multiple resource positions provided for the terminal until receiving the feedback data at a certain resource position.

In another possible implementation, when the terminal transmits the feedback data through the multiple resource positions, the base station may receive the feedback data through one of the resource positions or may also receive the feedback data through the multiple resource positions.

In another possible implementation, when the communication data includes the multiple data sets and the terminal transmits the feedback data corresponding to the multiple data sets through the multiple resource positions, the base station may receive the feedback data of each data set through one or more resource positions if it is ensured that the feedback data of all the data sets is received.

According to the method provided in the embodiments of the present disclosure, a base station may transmit a control instruction to a terminal, the control instruction carrying indication information and the indication information indicating multiple resource positions configured for the terminal to transmit feedback data in an unlicensed channel, so that multiple opportunities are provided for the terminal to transmit the feedback data, and under the condition that the terminal occupies the unlicensed channel, the feedback data may be transmitted through at least one resource position among the multiple resource positions. Therefore, the situation that the terminal successfully occupies the unlicensed channel but misses resource positions and thus cannot transmit the feedback data may be avoided, a success rate of transmitting the feedback data by the terminal through the unlicensed channel is increased, and furthermore, the reliability of data transmission is improved.

Figure 7:
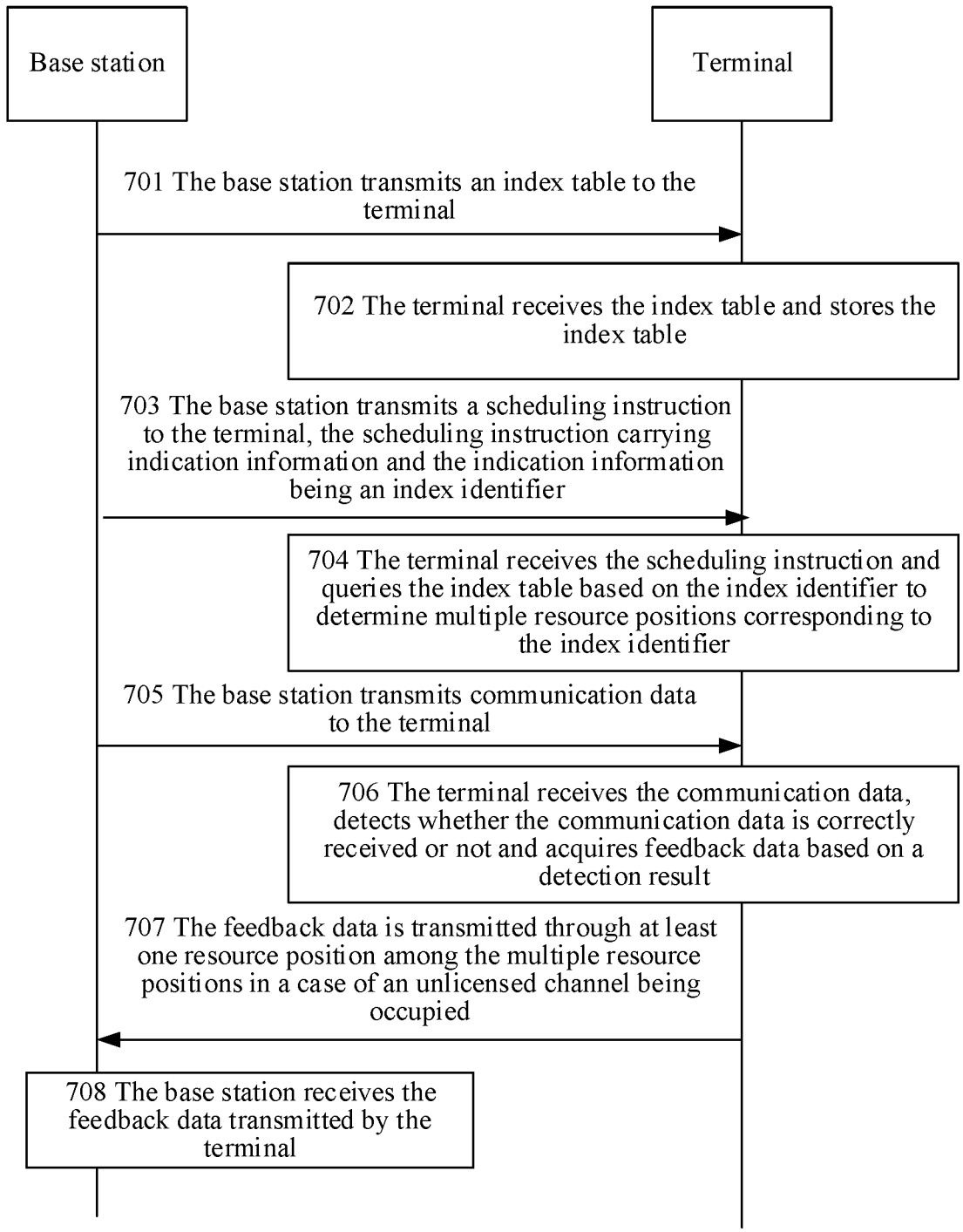
FIG. 7 is a flow chart of another data transmission method according to an exemplary embodiment.

FIG. 7 is a flow chart of a data transmission method according to an exemplary embodiment. A base station and a terminal are interaction bodies. Descriptions are made in the embodiment taking the condition that indication information is an index identifier as an example. As shown in FIG. 6, the method includes the following operations.

In Operation 701, the base station transmits an index table to the terminal.

In the embodiment of the present disclosure, the base station may create the index table based on multiple resource positions configured for the terminal to transmit data and transmit the index table to one or more terminals. The index table includes multiple resource positions corresponding to each index identifier.

Different index identifiers correspond to different multiple resource positions. Each terminal is only required to determine an index identifier and then may query the index table to determine multiple resource positions corresponding to the index identifier, thereby transmitting feedback data based on the determined multiple resource positions.

For example, the index table may be shown in the following Table 1. If the index identifier is 01, the corresponding multiple resource positions are 1 slot and 3 slots.

TABLE 1

| Index identifier | Resource position |
| --- | --- |
| 00 | 1 slot, 2 slots |
| 01 | 1 slot, 3 slots |
| 10 | 1 slot, 3 slots, 5 slots |
| 11 | 1 slot, 3 slots, 5 slots, 6 slots |

In a possible implementation, the base station may transmit the index table to the terminal in multiple manners such as by high-layer signaling or physical-layer signaling.

In another possible implementation, the base station may create an index table for all terminals and transmit the index table to each terminal. Each terminal may subsequently determine resource positions based on an index identifier. Or, the base station may also independently create an index table for each terminal and transmit the index table for each terminal to a corresponding terminal, and each terminal may subsequently determine a resource position to be adopted based on an index identifier. Moreover, in the index tables for different terminals, the numbers of resource positions and time-domain information and frequency-domain information of each resource position may be the same or different.

In Operation 702, the terminal receives the index table and stores the index table.

It is to be noted that the condition that a base station creates an index table and transmits the index table to a terminal is taken as an example only in the embodiment of the present disclosure. In practice, the operation 701 and operation 702 are optional. In another embodiment, the index table may be predefined in an agreement achieved by the base station and the terminal and is not required to be transmitted to the terminal by the base station.

In the embodiment of the present disclosure, signaling for transmitting the index table is extended, namely a set of the resource positions is transmitted to the terminal in advance, and then the terminal may subsequently determine resource positions from the index table as required, so that the flexibility is improved. Moreover, every time when configuring a resource position, the base station is required only to transmit an index identifier and but not needed to transmit the resource position, so that transmission resources are saved.

In Operation 703, the base station transmits a scheduling instruction to the terminal, the scheduling instruction carrying indication information and the indication information being an index identifier.

Operation 703 is similar to Operation 701, and the only difference is that: descriptions are made in the embodiment of the present disclosure taking the condition that the indication information is the index identifier as an example, and the terminal may subsequently determine the corresponding multiple resource positions based on the index identifier.

When the base station transmits the same index table to multiple terminals, the base station may determine the same index identifier for different terminals to determine the same resource positions for different terminals, or may also determine different index identifiers for different terminals to determine different resource positions for different terminals.

In a possible implementation, the base station, when transmitting a control instruction, may add the index identifier to an information field that is at a fixed position or configurable in the control instruction, and then the terminal, in response to receiving the control instruction, may acquire the index identifier from the information field at the fixed position in the control instruction and determine the multiple resource positions corresponding to the index identifier. Moreover, a bit length of the index identifier may be fixed or may be determined based on the number of resource positions configured in the index table. For example, when 11 resource positions and 4 corresponding index identifiers are set in the index table, the bit length of the index identifier in the control instruction is 2, namely the 4 different index identifiers are represented by 2 bits.

In Operation 704, the terminal receives the scheduling instruction and queries the index table based on the index identifier to determine multiple resource positions corresponding to the index identifier.

Since the terminal has stored the index table, the terminal, after receiving the scheduling instruction, may query the index table based on the index identifier in the scheduling instruction to determine the corresponding multiple resource positions.

In a possible implementation, the index table may include time-domain information and frequency-domain information of the multiple resource positions, or the time-domain information of the multiple resource positions, or the frequency-domain information of the multiple resource positions. A manner for determining the time-domain information and frequency-domain information of the resource positions is similar to that in Operation 402 and will not be elaborated herein.

In Operation 705, the base station transmits communication data to the terminal.

In Operation 706, the terminal receives the communication data, detects whether the communication data is correctly received or not and acquires feedback data based on a detection result.

The feedback data is configured to indicate whether the terminal has correctly received the communication data from the base station or not.

In Operation 707, the feedback data is transmitted through at least one resource position among the multiple resource positions in a case of an unlicensed channel being occupied.

In Operation 708, the base station receives the feedback data from the terminal.

Operations 705 to 708 are similar to Operations 403 to 406 and will not be elaborated herein.

According to the method provided in the embodiments of the present disclosure, a base station may transmit a control instruction to a terminal, the control instruction carrying index identifier, and the terminal may query an index table based on the index identifier to determine corresponding multiple resource positions, so that multiple opportunities are provided for the terminal to transmit feedback data. Under the condition that the terminal occupies the unlicensed channel, the feedback data may be transmitted through at least one resource position among the multiple resource positions. Therefore, the situation that the terminal successfully occupies the unlicensed channel but misses resource positions and thus cannot transmit the feedback data may be avoided, a success rate of transmitting the feedback data by the terminal through the unlicensed channel is increased, and furthermore, the reliability of data transmission is improved.

Figure 8:
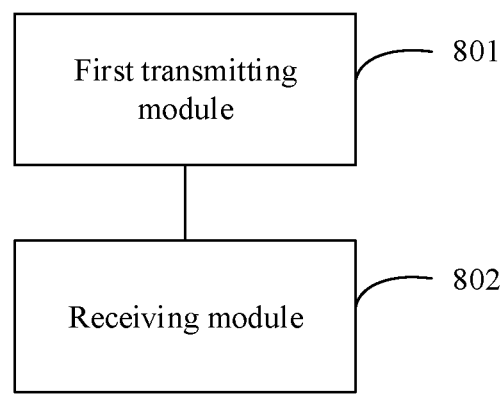
FIG. 8 is a block diagram of a data transmission device according to an exemplary embodiment.

FIG. 8 is a block diagram of a data transmission device according to an exemplary embodiment. The device is implemented by a base station. Referring to FIG. 8, the base station includes a first transmitting module 801 and a receiving module 802.

The first transmitting module 801 is configured to transmit a control instruction to a terminal, the control instruction carrying indication information and the indication information indicating multiple resource positions configured for the terminal to transmit feedback data in an unlicensed channel.

The receiving module 802 is configured to receive the feedback data from the terminal, the feedback data being transmitted by the terminal through at least one resource position among the multiple resource positions in a case of the unlicensed channel being occupied by the terminal and the feedback data indicating whether the terminal has correctly received communication data from the base station or not.

According to the device provided in the embodiment of the present disclosure, the base station may transmit a control instruction, the control instruction carrying indication information and the indication information indicating multiple resource positions configured for the terminal to transmit feedback data, so that multiple opportunities are provided for the terminal to transmit the feedback data. Under the condition that the terminal occupies the unlicensed channel, the feedback data may be transmitted through at least one resource position among the multiple resource positions. Therefore, the situation that the terminal successfully occupies the unlicensed channel but misses resource positions and thus cannot transmit the feedback data may be avoided, a success rate of transmitting the feedback data by the terminal through the unlicensed channel is increased, and furthermore, the reliability of data transmission is improved.

In a possible implementation, the first transmitting module 801 may include:

a transmission unit, configured to transmit a scheduling instruction to the terminal.

In another possible implementation, the indication information is an index identifier; and the device may further include:

a second transmitting module, configured to transmit an index table to the terminal, the index table including multiple resource positions corresponding to each index identifier and the index table being configured to query corresponding multiple resource positions based on any index identifier.

In another possible implementation, the communication data may includes multiple data sets; and the receiving module 802 may include:

a receiving unit, configured to receive feedback data corresponding to the multiple data sets through the multiple resource positions.

In another possible implementation, the indication information may be in an information field at a fixed position in the control instruction or in a configurable information field of the control instruction; and a bit length of the indication information may be fixed or may be determined based on a configuration.

In another possible implementation, the indication information may include time-domain information and frequency-domain information of the multiple resource positions; or, the indication information may include the time-domain information of the multiple resource positions, and the frequency-domain information of the multiple resource positions may be determined according to a first preset rule; or, the indication information may include the frequency-domain information of the multiple resource positions, and the time-domain information of the multiple resource positions may be determined according to a second preset rule.

It is to be noted that: during data transmission, the data transmission device provided in the embodiments is only described taking division of each abovementioned functional module as an example and, during a practical application, the abovementioned functions may be allocated to different functional modules for realization according to a requirement, that is, an internal structure of the base station is divided into different functional modules to realize all or part of the functions described above. In addition, the base station provided in the embodiment belongs to the same concept of the data transmission method embodiment and details about a specific implementation process thereof refer to the method embodiment and will not be elaborated herein.

Figure 9:
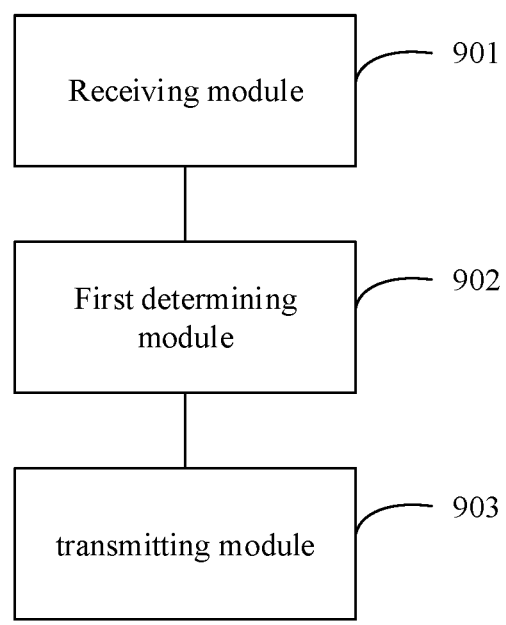
FIG. 9 is a block diagram of a data transmission device according to an exemplary embodiment.

FIG. 9 is a block diagram of a data transmission device according to an exemplary embodiment. The device is implemented by a terminal. Referring to FIG. 9, the terminal includes a receiving module 901, a first determining module 902 and a transmitting module 903.

The receiving module 901 is configured to receive a control instruction from a base station, the control instruction carrying indication information and the indication information indicating multiple resource positions configured for the terminal to transmit feedback data in an unlicensed channel.

The first determining module 902 is configured to determine the multiple resource positions based on the indication information.

The transmitting module 903 is configured to transmit the feedback data through at least one resource position among the multiple resource positions in the case of the unlicensed channel being occupied by the terminal, the feedback data indicating whether the terminal has correctly received communication data from the base station or not.

According to the device provided in the embodiment of the present disclosure, the terminal may receive a control instruction from the base station, the control instruction carrying indication information and the indication information indicating multiple resource positions configured for the terminal to transmit feedback data, so that multiple opportunities are provided for the terminal to transmit the feedback data. Under the condition that the terminal occupies the unlicensed channel, the feedback data may be transmitted through at least one resource position among the multiple resource positions. Therefore, the situation that the terminal successfully occupies the unlicensed channel but misses resource positions and thus cannot transmit the feedback data may be avoided, a success rate of transmitting the feedback data by the terminal through the unlicensed channel is increased, and furthermore, the reliability of data transmission is improved.

In a possible implementation, the receiving module 901 may include:

a receiving unit, configured to receive a scheduling instruction transmitted by the base station.

In another possible implementation, the indication information may be an index identifier; and the device may further include:

a second determining module, configured to query an index table based on the index identifier to determine the multiple resource positions corresponding to the index identifier, the index table including multiple resource positions corresponding to each index identifier.

In a possible implementation, the transmitting module 903 may include:

a first transmission unit, configured to transmit the feedback data through one resource position after a successful occupation time among the multiple resource positions in the case of the unlicensed channel being occupied by the terminal; or, a second transmission unit, configured to transmit the feedback data through a preset number of resource positions after a successful occupation time among the multiple resource positions respectively; or, a third transmission unit, configured to transmit the feedback data through each resource position after a successful occupation time among the multiple resource positions respectively.

In another possible implementation, the communication data includes multiple data sets; and the transmitting module 903 may include:

a fourth transmission unit, configured to transmit feedback data corresponding to the multiple data sets through multiple resource positions after a successful occupation time in the unlicensed channel in the case of the unlicensed channel being occupied by the terminal.

In another possible implementation, the transmitting module 903 is further configured to, in response to acquiring the feedback data, determine multiple resource positions within a time bucket after present time and an unlicensed channel where the multiple resource positions are located, and transmit the feedback data through a resource position in the unlicensed channel in the case of the unlicensed channel being occupied by the terminal.

In another possible implementation, the indication information may be in an information field at a fixed position in the control instruction or in a configurable information field of the control instruction; and a bit length of the indication information may be fixed or may be determined based on a configuration.

In another possible implementation, the indication information may include time-domain information and frequency-domain information of the multiple resource positions; or, the indication information may include time-domain information of the multiple resource positions, and frequency-domain information of the multiple resource positions may be determined according to a first preset rule; or, the indication information may include frequency-domain information of the multiple resource positions, and the time-domain information of the multiple resource positions may be determined according to a second preset rule.

It is to be noted that: during data transmission, the data transmission device provided in the embodiment is only described taking division of each abovementioned functional module as an example and, during a practical application, the abovementioned functions may be allocated to different functional modules for realization according to a requirement, that is, an internal structure of the terminal is divided into different functional modules to realize all or part of the functions described above. In addition, the terminal provided in the embodiment belongs to the same concept of the data transmission method embodiment and details about a specific implementation process thereof refer to the method embodiment and will not be elaborated herein.

Figure 10:
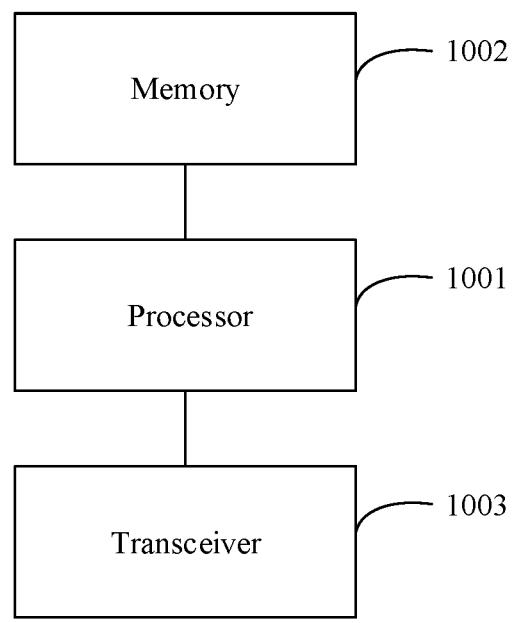
FIG. 10 is a block diagram of a base station according to an exemplary embodiment.

FIG. 10 is a block diagram of a base station according to an exemplary embodiment. Referring to FIG. 10, the base station includes a processor 1001, memory 1002 configured to store instructions executable by the processor, and a transceiver 1003. The processor 1001 is configured to execute the following instructions of:

transmitting a control instruction to a terminal, the control instruction carrying indication information and the indication information indicating multiple resource positions configured for the terminal to transmit feedback data in an unlicensed channel; and receiving the feedback data from the terminal, the feedback data being transmitted by the terminal through at least one resource position among the multiple resource positions in the case of the unlicensed channel being occupied by the terminal and the feedback data indicating whether the terminal has correctly received communication data from the base station or not.

There is also provided a computer-readable storage medium. An instruction in the computer-readable storage medium is executed by a processor of a base station to enable the base station to execute the data transmission method in the abovementioned embodiment.

Figure 11:
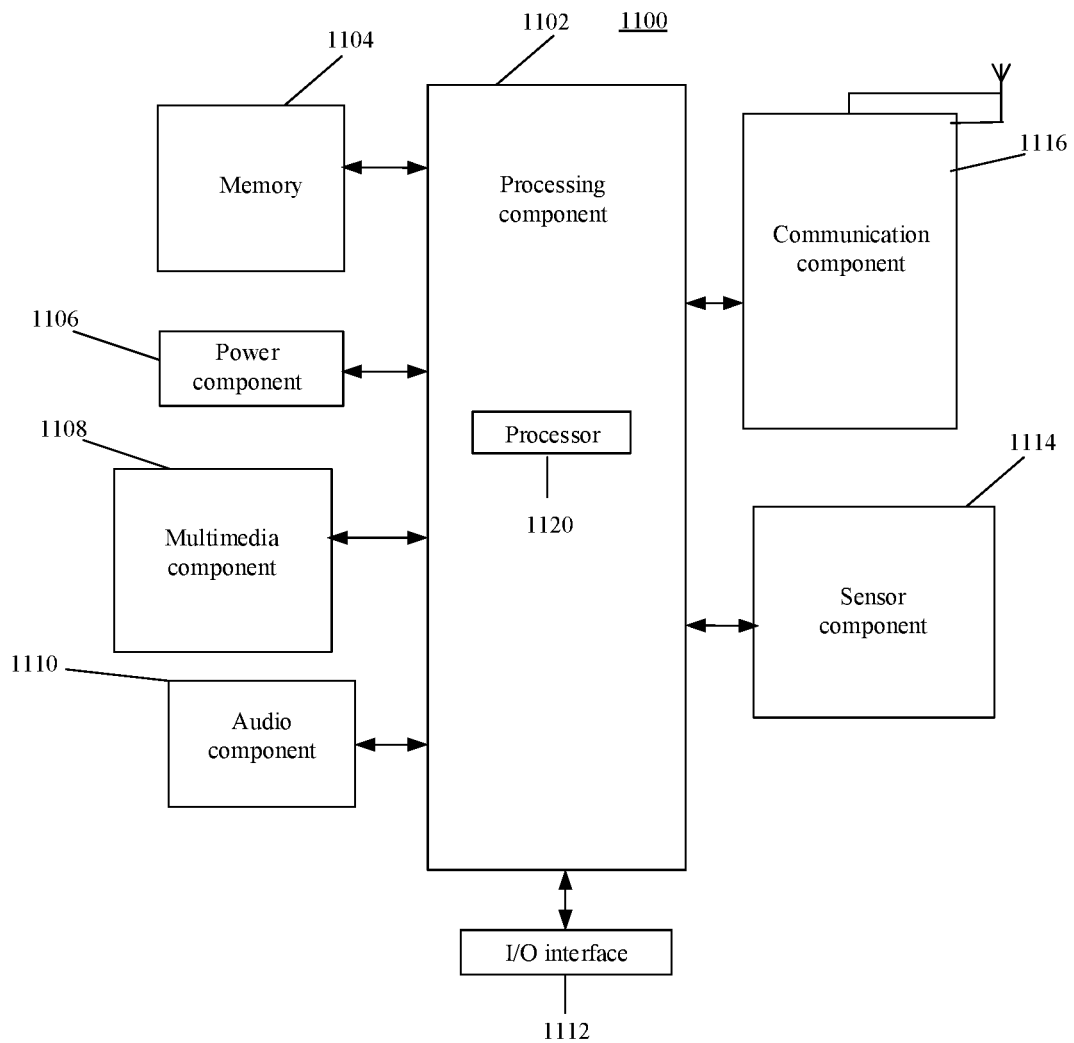
FIG. 11 is a block diagram of a terminal according to an exemplary embodiment.

FIG. 11 is a block diagram of a terminal 1100 according to an exemplary embodiment. For example, the terminal 1100 may be a mobile phone, a computer, a digital broadcast device, a messaging device, a gaming console, a tablet, a medical device, exercise equipment, a personal digital assistant and the like.

Referring to FIG. 11, the terminal 1100 may include one or more of the following components: a processing component 1102, memory 1104, a power component 1106, a multimedia component 1108, an audio component 1110, an Input/Output (I/O) interface 1112, a sensor component 1114, and a communication component 1116.

The processing component 1102 typically controls overall operations of the terminal 1100, such as the operations associated with display, telephone calls, data communications, camera operations, and recording operations. The processing component 1102 may include one or more processors 1120 to execute instructions to perform all or part of the operations in the abovementioned method. Moreover, the processing component 1102 may include one or more modules which facilitate interaction between the processing component 1102 and the other components. For instance, the processing component 1102 may include a multimedia module to facilitate interaction between the multimedia component 1108 and the processing component 1102.

The memory 1104 is configured to store various types of data to support the operation of the terminal 1100. Examples of such data include instructions for any application programs or methods operated on the terminal 1100, contact data, phonebook data, messages, pictures, video, etc. The memory 1104 may be implemented by any type of volatile or non-volatile memory devices, or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1106 provides power for various components of the terminal 1100. The power component 1106 may include a power management system, one or more power supplies, and other components associated with generation, management and distribution of power for the terminal 1100.

The multimedia component 1108 includes a screen providing an output interface between the terminal 1100 and a user. In some embodiments, the screen may include a Liquid Crystal Display (LCD) and a Touch Panel (TP). If the screen includes the TP, the screen may be implemented as a touch screen to receive an input signal from the user. The touch panel includes one or more touch sensors to sense touches, swipes and gestures on the touch panel. The touch sensors may not only sense a boundary of a touch or swipe action but also detect a duration and pressure associated with the touch or swipe action. In some embodiments, the multimedia component 1108 includes a front camera and/or a rear camera. The front camera and/or the rear camera may receive external multimedia data when the terminal 1100 is in an operation mode, such as a photographing mode or a video mode. Each of the front camera and the rear camera may be a fixed optical lens system or have focusing and optical zooming capabilities.

The audio component 1110 is configured to output and/or input an audio signal. For example, the audio component 1110 includes a Microphone (MIC), and the MIC is configured to receive an external audio signal when the terminal 1100 is in the operation mode, such as a call mode, a recording mode and a voice recognition mode. The received audio signal may further be stored in the memory 1104 or transmitted through the communication component 1116. In some embodiments, the audio component 1110 may further include a speaker configured to output the audio signal.

The I/O interface 1112 provides an interface between the processing component 1102 and a peripheral interface module, and the peripheral interface module may be a keyboard, a click wheel, a button and the like. The button may include, but not limited to: a home button, a volume button, a starting button and a locking button.

The sensor component 1114 includes one or more sensors configured to provide status assessment in various aspects for the terminal 1100. For instance, the sensor component 1114 may detect an on/off status of the terminal 1100 and relative positioning of components, such as a display and small keyboard of the terminal 1100, and the sensor component 1114 may further detect a change in a position of the terminal 1100 or a component of the terminal 1100, presence or absence of contact between the user and the terminal 1100, orientation or acceleration/deceleration of the terminal 1100 and a change in temperature of the terminal 1100. The sensor component 1114 may include a proximity sensor configured to detect presence of an object nearby without any physical contact. The sensor component 1114 may also include a light sensor, such as a Complementary Metal Oxide Semiconductor (CMOS) or Charge Coupled Device (CCD) image sensor, configured for use in an imaging application. In some embodiments, the sensor component 1114 may also include an acceleration sensor, a gyroscope sensor, a magnetic sensor, a pressure sensor or a temperature sensor.

The communication component 1116 is configured to facilitate wired or wireless communication between the terminal 1100 and another device. The terminal 1100 may access a communication-standard-based wireless network, such as a Wireless Fidelity (Wi-Fi) network, a 2nd-Generation (2G) or 3rd-Generation (3G) network or a combination thereof. In an exemplary embodiment, the communication component 1116 receives a broadcast signal or broadcast associated information from an external broadcast management system through a broadcast channel. In an exemplary embodiment, the communication component 1116 may further include a Near Field Communication (NFC) module to facilitate short-range communication.

In an exemplary embodiment, the terminal 1100 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the data transmission method.

In an exemplary embodiment, there is also provided a non-transitory computer-readable storage medium including an instruction, such as the memory 1104 including an instruction, and the instruction may be executed by the processor 1120 of the terminal 1100 to implement the abovementioned method. For example, the non-transitory computer-readable storage medium may be a ROM, a Random-Access Memory (RAM), a Compact Disc Read-Only Memory (CD-ROM), a magnetic tape, a floppy disc, an optical data storage device and the like.

There is also provided a computer-readable storage medium. An instruction in the computer-readable storage medium is executed by a processor of a terminal to enable the terminal to execute the method in the abovementioned embodiment. The method includes that:

a control instruction transmitted by a base station is received, the control instruction carrying indication information and the indication information indicating multiple resource positions configured for the terminal to transmit feedback data in an unlicensed channel;

the multiple resource positions are determined based on the indication information; and the feedback data is transmitted through at least one resource position among the multiple resource positions in the case of the unlicensed channel being occupied by the terminal, the feedback data indicating whether the terminal has correctly received communication data from the base station or not.

Those of ordinary skill in the art should know that implementation of all or part of the operations of the abovementioned embodiments may be completed through hardware and may also be completed through related hardware instructed by a program. The program may be stored in a computer-readable storage medium. The storage medium may be a ROM, a magnetic disk, an optical disc or the like.

The above is only some optional embodiments of the embodiments of the present disclosure and not intended to limit the present disclosure. Any modifications, equivalent replacements, improvements and the like made within the spirit and principle of the embodiments of the present disclosure shall fall within the scope of protection of the embodiments of the present disclosure.

What is claimed is:

1. A data transmission method, implemented by a base station and comprising:

transmitting a control instruction to a terminal, the control instruction carrying indication information and the indication information indicating multiple resource positions configured for the terminal to transmit feedback data in an unlicensed channel; and receiving feedback data from the terminal, the feedback data being transmitted by the terminal through at least one resource position among the multiple resource positions in a case of the unlicensed channel being occupied by the terminal, and the feedback data indicating whether the terminal has correctly received communication data from the base station or not, wherein the indication information is an index identifier; and the method further comprises:

transmitting an index table to the terminal, the index table comprising multiple resource positions corresponding to each index identifier and the index table being configured to query corresponding multiple resource positions based on any index identifier.

2. The method of claim 1, wherein the communication data comprises multiple data sets; receiving the feedback data from the terminal comprises:

receiving the feedback data corresponding to the multiple data sets through the multiple resource positions.

3. The method of claim 1, wherein the indication information is in an information field at a fixed position in the control instruction or in a configurable information field of the control instruction; and a bit length of the indication information is fixed or is determined based on a configuration.

4. The method of claim 1, wherein the indication information comprises time-domain information and frequency-domain information of the multiple resource positions; or, the indication information comprises time-domain information of the multiple resource positions, and frequency-domain information of the multiple resource positions is determined according to a first preset rule; or, the indication information comprises frequency-domain information of the multiple resource positions, and time-domain information of the multiple resource positions is determined according to a second preset rule.

5. A data transmission method, implemented by a terminal and comprising:

receiving a control instruction from a base station, the control instruction carrying indication information and the indication information indicating multiple resource positions configured for the terminal to transmit feedback data in an unlicensed channel;

determining the multiple resource positions based on the indication information; and transmitting feedback data through at least one resource position among the multiple resource positions in a case of the unlicensed channel being occupied by the terminal, the feedback data indicating whether the terminal has correctly received communication data from the base station or not, wherein the indication information is an index identifier; and said determining the multiple resource positions based on the indication information comprises:

querying an index table based on the index identifier to determine the multiple resource positions corresponding to the index identifier, the index table comprising multiple resource positions corresponding to each index identifier.

6. The method of claim 5, wherein transmitting the feedback data through the at least one resource position among the multiple resource positions in the case of the unlicensed channel being occupied by the terminal comprises:

transmitting the feedback data through one resource position after a successful occupation time among the multiple resource positions in the case of the unlicensed channel being occupied by the terminal; or, transmitting the feedback data through a preset number of resource positions after a successful occupation time among the multiple resource positions respectively; or, transmitting the feedback data through each resource position after a successful occupation time among the multiple resource positions respectively.

7. The method of claim 5, wherein the communication data comprises multiple data sets;

transmitting the feedback data through the at least one resource position among the multiple resource positions in the case of the unlicensed channel being occupied by the terminal comprises:

transmitting the feedback data corresponding to the multiple data sets through multiple resource positions after a successful occupation time in the unlicensed channel in the case of the unlicensed channel being occupied by the terminal.

8. The method of claim 5, wherein transmitting the feedback data through the at least one resource position among the multiple resource positions in the case of the unlicensed channel being occupied by the terminal comprises:

in response to acquiring the feedback data, determining multiple resource positions within a time bucket after present time and an unlicensed channel where the multiple resource positions are located; and transmitting the feedback data through a resource position in the unlicensed channel in the case of the unlicensed channel being occupied by the terminal.

9. The method of claim 5, wherein the indication information is in an information field at a fixed position in the control instruction or in a configurable information field of the control instruction; and a bit length of the indication information is fixed or is determined based on a configuration.

10. The method of claim 5, wherein the indication information comprises time-domain information and frequency-domain information of the multiple resource positions; or, the indication information comprises time-domain information of the multiple resource positions, and frequency-domain information of the multiple resource positions is determined according to a first preset rule; or, the indication information comprises frequency-domain information of the multiple resource positions, and time-domain information of the multiple resource positions is determined according to a second preset rule.

11. A data transmission device, implemented by a base station and comprising:

a processor; and a memory configured to store instructions executable by the processor, wherein the processor is configured to:

transmit a control instruction to a terminal, the control instruction carrying indication information and the indication information indicating multiple resource positions configured for the terminal to transmit feedback data in an unlicensed channel; and receive feedback data from the terminal, the feedback data being transmitted by the terminal through at least one resource position among the multiple resource positions in a case of the unlicensed channel being occupied by the terminal, and the feedback data indicating whether the terminal has correctly received communication data from the base station or not, wherein the indication information is an index identifier; and the processor is further configured to:

transmit an index table to the terminal, the index table comprising multiple resource positions corresponding to each index identifier and the index table being configured to query corresponding multiple resource positions based on any index identifier.

12. The device of claim 11, wherein the communication data comprises multiple data sets; and the processor is further configured to:

receive the feedback data corresponding to the multiple data sets through the multiple resource positions.

13. A data transmission device implementing the method of claim 5, comprising:

a processor; and a memory configured to store instructions executable by the processor, wherein the processor is configured to implement steps of the method.

14. The device of claim 13, wherein the processor is further configured to:

transmit the feedback data through one resource position after a successful occupation time among the multiple resource positions in the case of the unlicensed channel being occupied by the terminal; or, transmit the feedback data through a preset number of resource positions after a successful occupation time among the multiple resource positions respectively; or, transmit the feedback data through each resource position after a successful occupation time among the multiple resource positions respectively.

15. The device of claim 13, wherein the communication data comprises multiple data sets; and the processor is further configured to:

transmit the feedback data corresponding to the multiple data sets through multiple resource positions after a successful occupation time in the unlicensed channel in the case of the unlicensed channel being occupied by the terminal.

16. The device of claim 13, wherein the processor is further configured to, in response to acquiring the feedback data, determine multiple resource positions within a time bucket after present time and an unlicensed channel where the multiple resource positions are located, and transmit the feedback data through a resource position in the unlicensed channel in the case of the unlicensed channel being occupied by the terminal.

\* \* \* \* \*